Patented Jan. 8, 1946

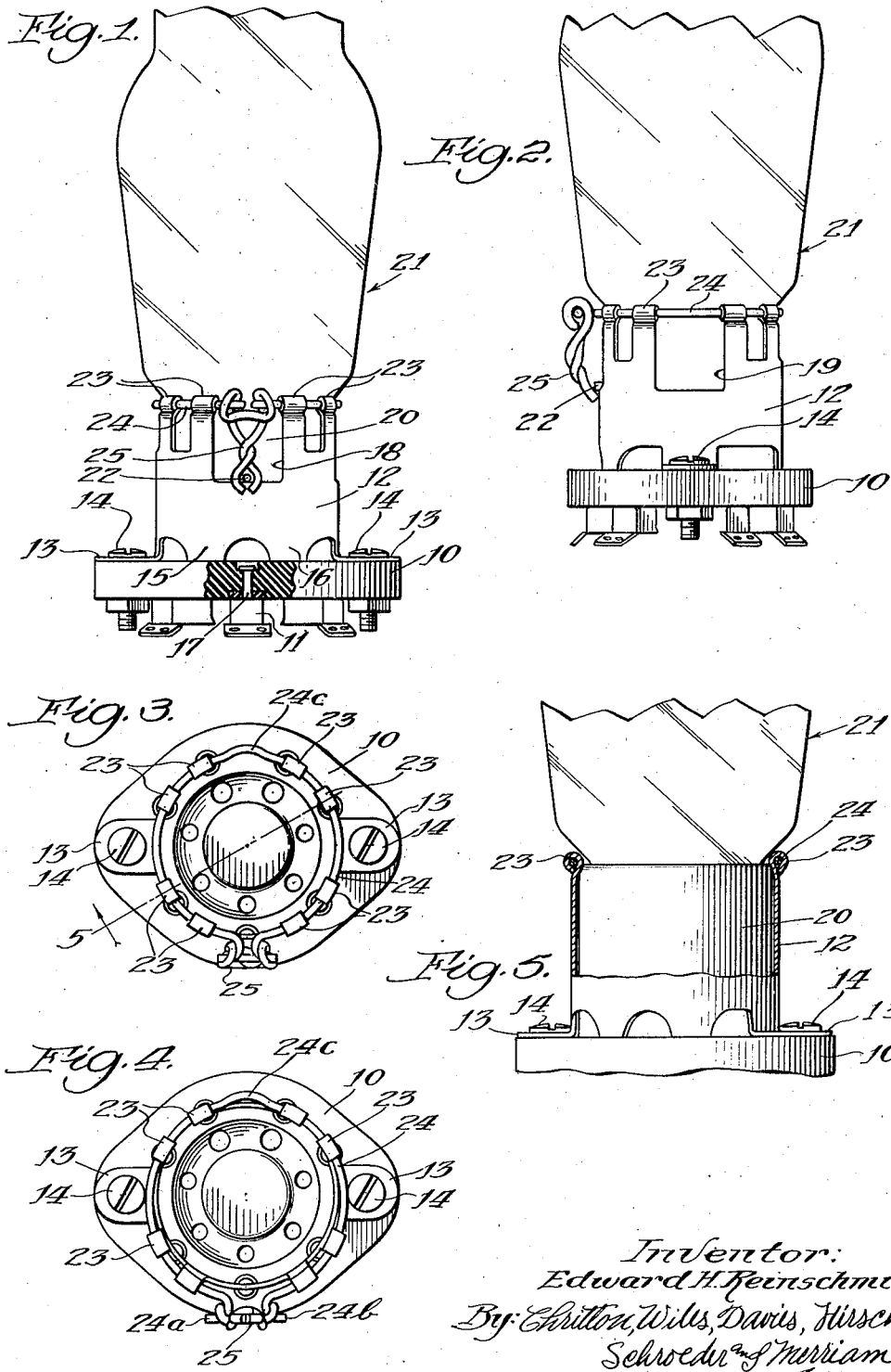

2,392,410

UNITED STATES PATENT OFFICE 2,392,410

TUBE LOCKING DEVICE

Edward H. Reinschmidt, Cedar Rapids, Iowa, assignor to Collins Radio Company, a corporation of Iowa Application October 2, 1942, Serial No. 460,569

4 Claims. (Cl. 173—328)

This invention relates to a tube locking device, an arrangement for releasably but rigidly securing a radio tube in operative position in its socket.

One feature of this invention is that it provides an improved tube hold-down; another feature of this invention is that the device may be very quickly and easily operated; yet another feature is that the locking and unlocking operation may be readily effected even when the socket is in a relatively inaccessible position in the set; a further feature of the invention is that a very positive locking action is secured; yet a further feature is that the locking device holds the tube rigidly and prevents any rocking or sway relative to the socket; and other features and advantages of this invention will be apparent from the following specification and drawing, in which:

Figure 1 is an elevation of a socket provided with my locking device and having a tube therein; Figure 2 is another elevation, but at right angles to the view in Figure 1; Figure 3 is a plan view of the socket and locking device with the tube removed, but with the device in locked position; Figure 4 is a view similar to Figure 3, but with the device in unlocked position; and Figure 5 is a side view, partially in section, showing the parts in locked position.

Tube locking devices heretofore in commercial use have been of two general types, both being open to serious objections. One such form comprises a clamping band with a screw adapted to draw its ends together to cause it to frictionally grip the tube base, this device being relatively slow in operation and not capable of use where the socket is in a position where the screw cannot be reached from one side with a screw driver. The other form of locking device in general commercial use comprises a dished ring of spring metal which must bite into the material of the tube base to provide a good lock, and which is, therefore, unsatisfactory where the base is of material, as certain ceramics, presenting a hard and smooth surface.

My arrangement overcomes these and other objections to previous tube locking devices. It comprises, in general, a shell rigidly fastened to the socket and having a plurality of finger-like portions terminating immediately adjacent the upper edge of the base of the tube when it is in operative position, and quickly operable cam-and-lever means adapted to force the ends of the fingers in and cause them partially to overlie the annular shoulder provided by the upper edge of the tube base.

In the particular embodiment of my invention, illustrated in the drawing, a socket 10 of the disc type is shown. This socket is provided, in conventional manner, with openings (best seen in Figures 3 and 4) adapted to receive the prongs of the tube, contact fingers for such prongs being fastened beneath the body of the socket, and connector tabs, as tab 11, being provided for electrical connection.

The locking device comprises as its main portion a cylindrical shell 12, tabs 13 enabling the shell to be fastened to the socket by the bolts 14 which are used for mounting the socket on the chassis. In order that the shell may be rigidly positioned with respect to the socket it is formed with spaced portions intermediate the tabs, as the portions 15 and 16, which engage the upper surface of the socket. These portions should be separated by recesses, as shown, in order to prevent arcing or leakage between the shell and the rivets holding the tube contact prongs, as the rivet 17 shown in Figure 1. The shell is provided with two deep slots here identified as slots 18 and 19. The cylindrical shell is intended, of course, to receive the base 20 of a conventional radio tube, here indicated in general as 21, in a close but not tight fit, and the slots provide clearance for the conventional tube pin 22 in either of two positions.

The upper portion of the shell 12 terminates in a plurality of separate spring fingers 23 symmetrically arranged about the axis of the tube base. There should be at least three and preferably more of these fingers, eight being shown. The upper ends of these fingers are radially movable, are turned back on themselves to encircle a wire clamping ring 24, and (as may be best seen in Figure 5) are adapted just slightly to overlie the annular shoulder provided by the upper edge of the tube base 20 when they are in innermost position.

The clamping ring 24 has adjacent ends provided with hooked portions 24a and 24b adapted to cooperate with a camming lever 25, here shown as also made of wire. This particular form of operating lever is available on the open market for other purposes and it is believed that a detailed description is not necessary. It is sufficient to point out that the portions which cooperate with the clamping ring ends 24a and 24b are disposed at an angle to have a camming action, so that when the operating lever 25 is in the position shown in Figures 1, 2 and 3, the ends of the ring are drawn together to contract its diameter, this position being slightly over-center, and when the lever is swung up through an arc of approximately 180°, the ends of the ring are permitted to spread apart to increase its diameter, as is shown in Figure 4. It is also desirable to provide a bent or slightly looped portion formed with a shorter radius of curvature than the remainder of the ring, as the portion 24c, to provide limited expansion or give in the ring, this enabling smoother action as the toggle lever passes over center (without excessive strain on the parts), and compensating for slight differences in size and shape of the parts, within permissible manufacturing tolerances. This also avoids breakage of the tube or damage to the clamping device if it is operated when the tube is not completely in the socket.

In order to insert the tube in the socket, it is only necessary to have the lever in unlocked position, with the ring and fingers spread as shown in Figure 4. After the tube is in operative position the operating lever 25 is flipped down to locked position, and this contracts the ring and the upper ends of the fingers into locked position, best shown in Figure 5. The length of the fingers and the contraction of the ring must be so proportioned that there is what might be termed a balancing action on the outer edge of the annular shoulder provided by the upper edge of the tube base. If the fingers fail to overlie this upper edge at all, the device operates by frictional grip only and is not as satisfactory; while if the fingers are too long and the ring contracts them considerably over the upper edge of the tube base, the glass envelope of the tube may be subjected to undesirable pressure and broken. The proportioning of the parts should be such that, as is shown in Figure 5, all of the fingers just slightly overlie the outer edge of the shoulder of the tube base and bear against it in such a way that their force is exerted downwardly and inwardly at approximately a 45° angle.

It is obvious that the locking device here disclosed has a very firm grip on the tube and locks it rigidly in the socket, experiments showing that the glass always breaks or separates from the tube base before the base pulls out of the socket. Moreover, operation of the device is very quick and convenient, merely requiring flipping of the operating lever 25 between its terminal positions; and where the device is in a place inaccessible to the fingers, this can be done with a screw driver, a loop of wire, or the like. Where the prong and pin arrangements are different, as is the case with some types of tubes having the same size base, the additional slot 19 (shown in Figure 2) provides for such variation. In such a case, of course, the clamping ring and operating lever are assembled in such a way that the separable ends of the clamping ring lie in the slot 19, since the tube pin must pass between these ends in entering the socket.

While I have described and shown certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for locking in its socket in a radio set an operative element of the set having a base providing an annular shoulder with a square outer edge, including: means adapted to be fastened to the socket and having at least three spring metal finger portions with their upper ends radially movable; a contractible clamping ring fastened to said upper ends and adapted, when contracted, to move them inwardly and retain them in locking position adapted to engage the outer edge of said shoulder without engaging any part of said element other than the base; and actuating means for contracting said ring, this actuating means being so constructed and arranged as to have an over-center action providing positive locking of the ring when it is contracted.

2. Apparatus of the character claimed in claim 1, wherein the clamping ring has a portion formed with a shorter radius of curvature than the remainder of the ring to provide limited expansion.

3. Apparatus of the character described for locking in its socket in a radio set an operative element of the set having a base providing an annular shoulder with a square outer edge, the socket having spaced connector members adapted to make electrical connection with cooperating portions of said element, including: means adapted to engage the socket at a plurality of symmetrically arranged spaced points intermediate said connector members and adapted to be fastened thereto at at least two such points, said means having at least three spring metal finger portions with their upper ends radially movable; a contractible clamping ring fastened to said upper ends and adapted, when contracted, to move them inwardly and retain them in locking position adapted to engage the outer edge of said shoulder without engaging any part of said element other than the base; and actuating means for contracting said ring, this actuating means being so constructed and arranged as to have an over-center action providing positive locking of the ring when it is contracted.

4. Apparatus of the character described for locking in its socket a radio tube having an envelope and a base providing an annular shoulder with a square outer edge, including: a member fastened to the socket and having a cylindrical portion adapted to just receive the tube base, and at least three symmetrically arranged vertical finger portions of spring metal with their lower ends rigidly attached to the cylindrical portion and their upper ends radially movable adjacent said shoulder; a clamping ring fastened to said upper ends and adapted, when contracted, to move them in to locking position where they are adapted to only slightly overlie the outer edge of said shoulder without touching said envelope, the proportioning of the parts being such that the locking force is adapted to be exerted inwardly and downwardly on the outer edge of said shoulder; and quick-acting actuating means for contracting said ring, this actuating means being so constructed and arranged as to have an over-center action providing positive locking of the ring when it is contracted.

EDWARD H. REINSCHMIDT.